Dec. 1, 1959   E. W. LUSTED   2,915,339
DISCHARGE MEANS FOR STORAGE VESSELS
Filed Dec. 23, 1958   3 Sheets-Sheet 1

INVENTOR.
EMILE W. LUSTED
BY
ATTORNEYS

Dec. 1, 1959 E. W. LUSTED 2,915,339
DISCHARGE MEANS FOR STORAGE VESSELS
Filed Dec. 23, 1958 3 Sheets-Sheet 3

INVENTOR.
EMILE W. LUSTED

United States Patent Office 2,915,339
Patented Dec. 1, 1959

2,915,339

DISCHARGE MEANS FOR STORAGE VESSELS

Emile W. Lusted, Baton Rouge, La., assignor, by mesne assignments, to Fuller Company, Catasauqua, Pa., a corporation of Delaware Application December 23, 1958, Serial No. 782,555

9 Claims. (Cl. 302—53)

This invention relates to a vessel in which pulverulent material may be stored and from which it subsequently may be discharged in suspension in a gaseous stream and carried through a pneumatic conveying line to any desired location. It particularly relates to such a storage and discharge vessel embodying means for discharging the pulverulent material from the vessel in a condition most favorable for its entrainment into the suspending gas stream, and to such a vessel in which the discharge will be independent of the overlying head of material in the vessel and can be caused to remain relatively uniform during the entire unloading of the vessel. It also embodies such a vessel in which access may readily be obtained to any of the parts which may get out of order for replacement or repair.

In the application of Isidore H. Friedman, Jr., Serial No. 782,557 filed December 23, 1958, there is disclosed and claimed a pressurized vessel for the storage and subsequent discharge of pulverulent material into a pneumatic conveying line in which the gas for carrying the material through the conveying line is taken from the pressure gas in the upper portion of the vessel. In one form of the invention disclosed in that application, the vessel is elongated in a horizontal direction and has a gas-permeable deck extending along the bottom of the vessel at each end, with the gas-permeable decks being inclined downwardly toward a central discharge outlet which communicates with the conveying line. The discharge outlet is enclosed by a housing which prevents the flow of pulverulent material from the vessel to the discharge outlet except through an opening adjacent the lower ends of the gas-permeable decks. The flow of pulverulent material fluidized on the gas-permeable deck is controlled by a disc valve having the operating handle therefor extending through the vessel to the outside thereof where it is readily accessible. A gas conduit extends from the housing to the upper part of the vessel and forms a passage for pressure gas from the upper part of the vessel to the discharge outlet and pneumatic conveying line connected thereto. In operation, gas is introduced into a plenum chamber beneath the gas-permeable decks and passes upwardly into and through the overlying pulverulent material, fluidizing it and causing it to flow downwardly along the upper surface of each of the gas-permeable decks towards the center of the vessel where it is discharged from the gas-permeable decks through the opening in the housing. Since the vessel is sealed, the gas which passes upwardly through the gas-permeable decks and escapes from the upper surface of the fluidized material builds up a pressure in the upper portion of the vessel and, upon continued introduction of the gas, the gas passes, as a flowing stream, downwardly through the gas conduit to the housing which encloses the discharge outlet and which receives the pulverulent material from the ends of the gas-permeable decks. This downwardly-flowing stream of gas entrains the pulverulent material passing into the housing and carries it in suspension through the discharge outlet and into and through the conveying line to the desired location.

The present invention relates to a storage and discharge vessel of the general character disclosed in the foresaid application, and more particularly to such a vessel in which the housing and the valve means for controlling the flow of pulverulent material from the gas-permeable decks to the discharge outlet are formed as a separate or independent unit which may be attached to the outside of the vessel and which receives the fluidized material flowing from the lower ends of the gas-permeable decks through an opening in the bottom of the vessel. This separate unit, which in effect forms a continuation of the vessel, is divided by a central partition into two chambers. The first chamber receives the material directly from the opening in the bottom of the vessel. The second chamber functions as the housing of the foresaid application, and the gas conduit which extends from the upper portion of the vessel is connected to the upper portion of this chamber so that the flowing stream of gas from the upper portion of the vessel flows downwardly through the gas conduit into this chamber. The second chamber also has a material and gas outlet at its lower end to which a discharge pipe is connected. The partition has an opening for the flow of material from the first chamber into the second chamber where the material is picked up and entrained by the gaseous stream flowing downwardly through the gas conduit and the chamber and is discharged through the discharge outlet. The extent to which the opening in the partition is exposed for the flow of material is controlled by a rotating disc valve similar to that disclosed in the foresaid application. The first chamber has aerating means in its bottom so that material falling into it from the lower ends of the gas-permeable decks does not lose its fluidity before it passes through the opening in the partition to be entrained by the flowing gas stream which entrains it and carries it through the material and gas discharge outlet to the conveying line.

In large vessels for the storage of relatively heavy material, such as hydraulic cement, the head of the material or pseudo-hydrostatic head may be excessive to the extent that it will tend to cause the material to be extruded or squirted through even the smallest valve opening. This makes the opening at the valve for controlling the flow of material to the discharge outlet extremely critical, particularly at the beginning of the unloading operation.

The present invention further embodies means for preventing the head or pseudo-hydrostatic pressure from being effective to cause an extruding or squirting of the material through the opening in the controlled valve so that with any setting of the valve there will be a smooth and uniform flow of material therethrough. This is accomplished by placing a pressure-breaker or deflecting baffle within the vessel and above the opening therein through which the fluidized material from the lower ends of the gas-permeable decks flows into the first chamber of the separate or independent unit attached to the vessel. The pressure-breaker or deflecting baffle supports the weight of the overlying head of the material and prevents it from being effective on the material in the first chamber of the separate unit from which it is discharged into the second chamber of that unit and through the discharge outlet thereof into the conveying line.

The invention will be further described in connection with the accompanying drawings in which a preferred embodiment of the invention is illustrated.

In the drawings:

Fig. 5 is a transverse sectional view showing the manner of introducing the gas into the plenum chamber beneath the gas-permeable decks.

Figure 1:
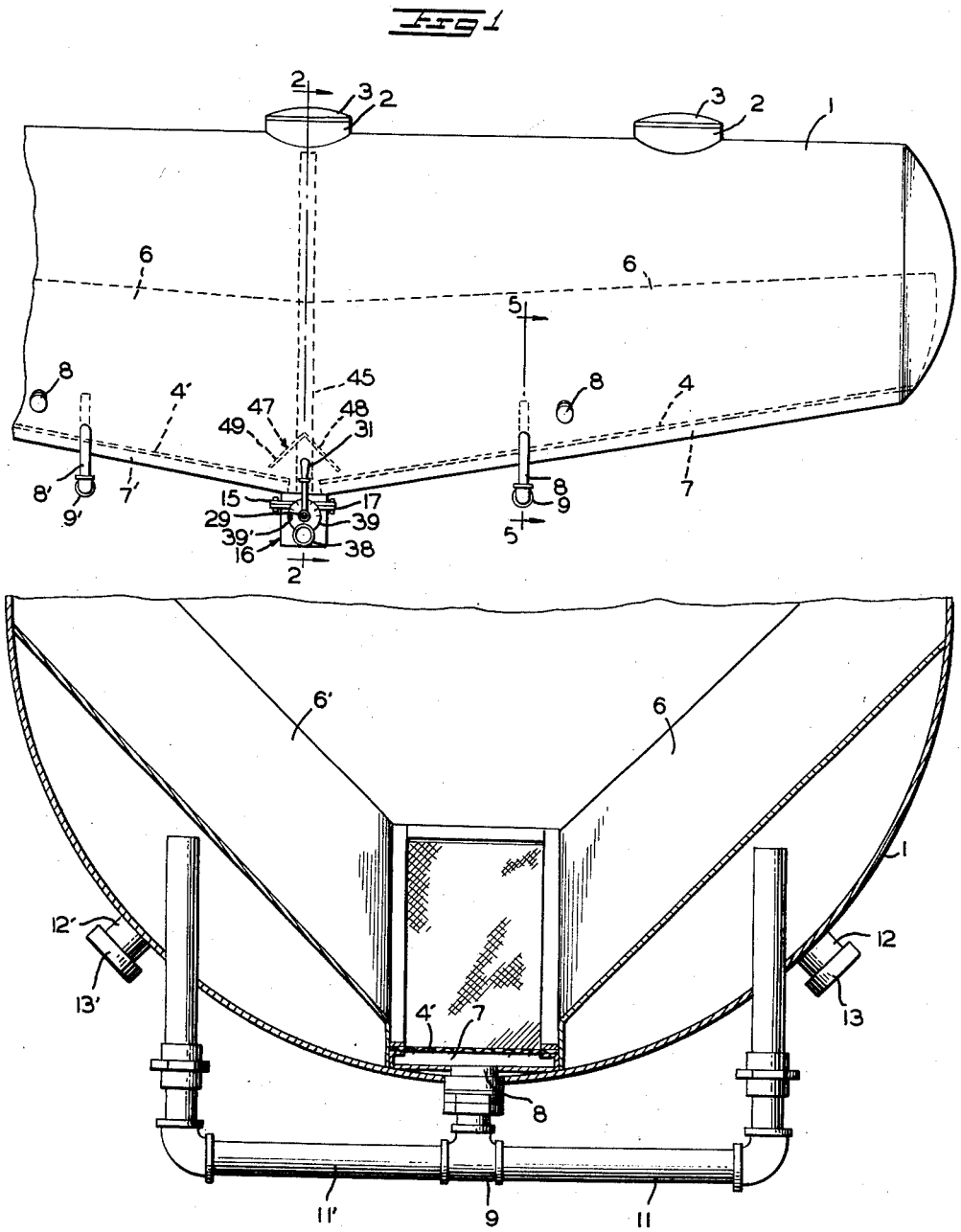
Fig. 1 is a side view of a storage and discharge vessel embodying the invention.
Figure 2:
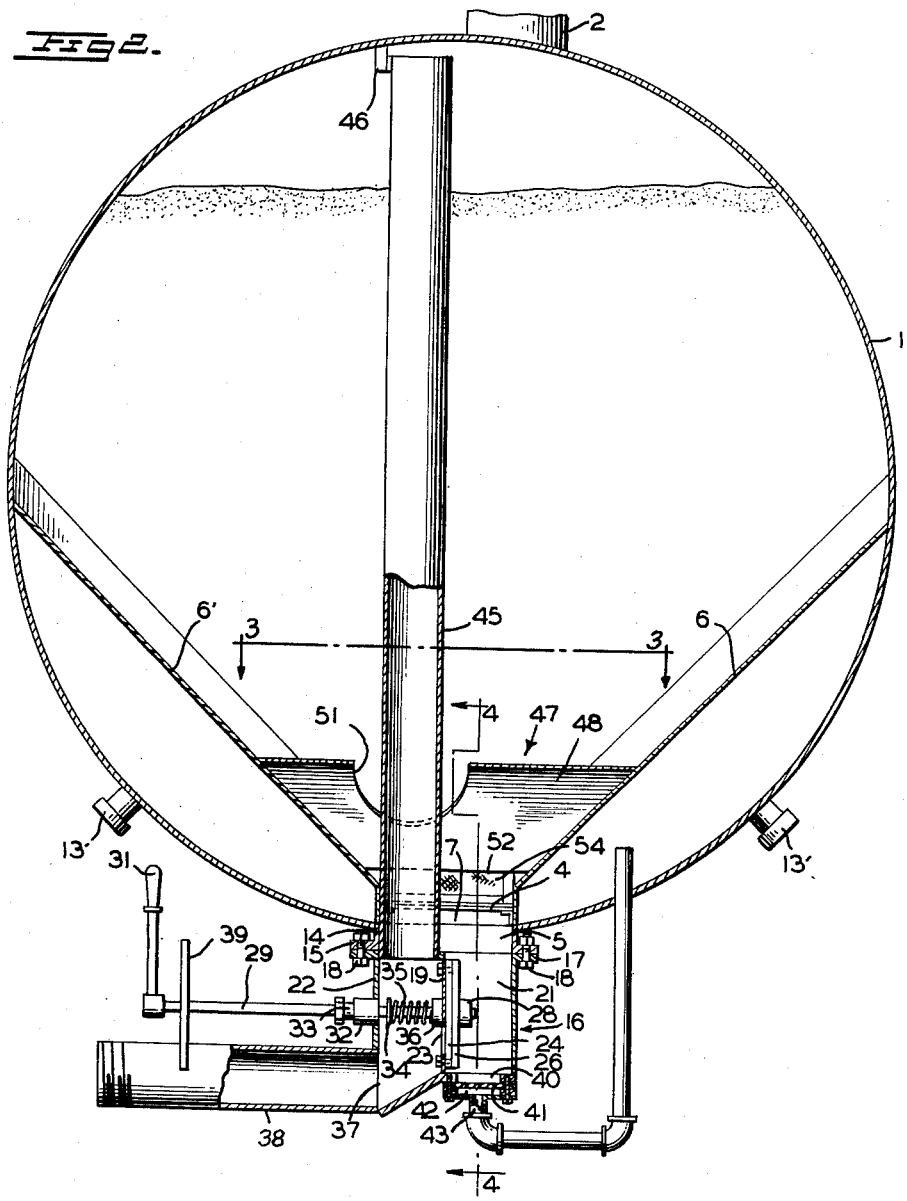
Fig. 2 is a transverse sectional view on line 2—2 of Fig. 1, on an enlarged scale.
Figure 3:
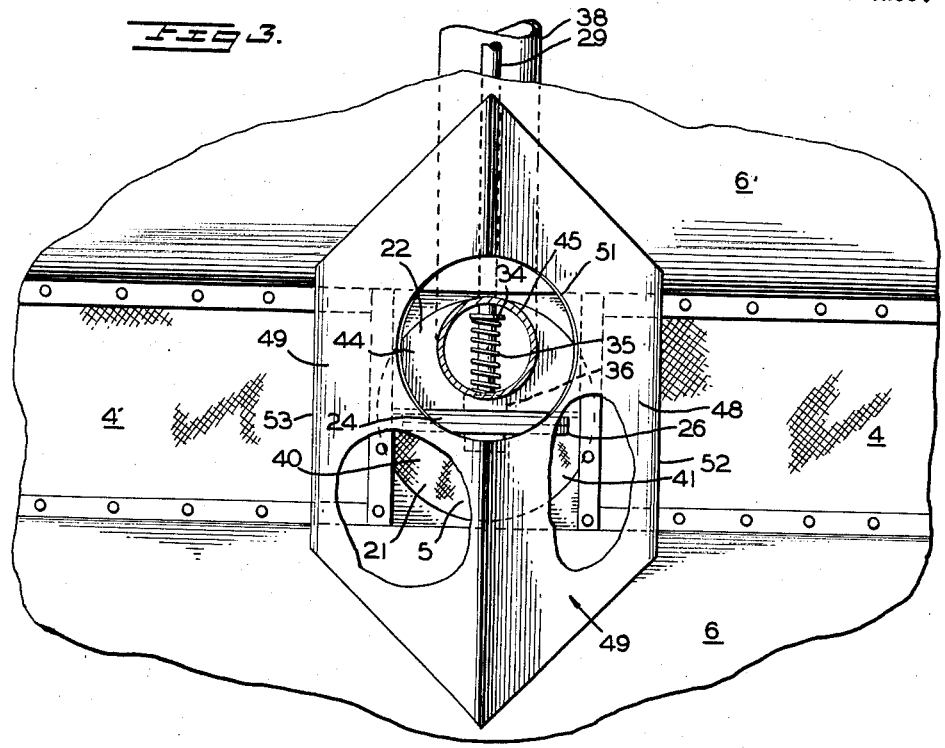
Fig. 3 is a view on line 3—3 of Fig. 2, looking in the direction of the arrows, with parts broken away.
Figure 4:
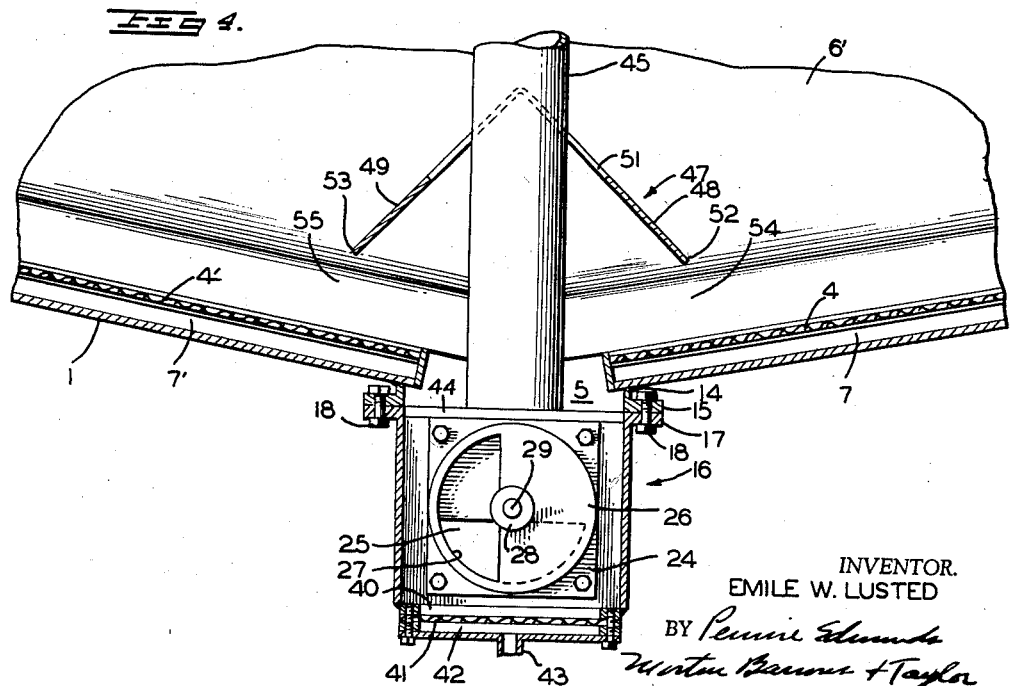
Fig. 4 is a sectional view on line 4—4 of Fig. 2.

Referring now to the drawings, the storage and discharge vessel or chamber 1 is shown as being of generally cylindrical, elongated form, but it may be of any other shape and of any size. It may be stationary or portable, and may, if desired, form the tank of a railroad car or of a truck or trailer. It has filling necks 2 at the top which normally are sealed by closure 3 of any suitable type.

Gas-permeable decks 4 and 4' extend along the longitudinal center of the vessel from each end in a downwardly-inclined position, to the center of the vessel. The gas-permeable decks preferably are made of heavy, multiply woven textile material similar to that used as canvas belting, but any other gas-permeable material having the desired gas permeability may be used. The downward inclination of the gas-permeable decks is slightly greater than the angle of repose of the pulverulent material to be stored in the vessel when the material is in is fluidized state, so that when the pulverulent material overlying the gas-permeable decks is fluidized in the manner hereinafter described, it will flow downwardly along the upper surface of the gas-permeable decks to be discharged from their lower ends to pass through a discharge opening 5 in the bottom of the vessel.

Slope sheets 6 and 6' extend upwardly from the longitudinal sides of each of the gas-permeable decks to the adjacent sides of the vessel. The downward inclination of the slope sheets is slightly greater than the angle of repose of the pulverulent material to be stored in the vessel when it is in its unaerated state so that the material always will flow downwardly along the slope sheets onto the gas-permeable decks. The slope sheets are welded or otherwise secured to the sides and ends of the vessel with a gas-tight connection, to provide pressure chambers beneath them extending the full length of the vessel.

Plenum chambers 7 and 7' are formed beneath the gas-permeable decks 4 and 4', respectively, from which a suitable gas, usually air, is adapted to pass upwardly through the gas-permeable decks into the overlying pulverulent material to fluidize it.

Gas inlets 8 and 8' extend into the bottoms of the respective plenum chambers. The lower ends of these gas inlets terminate in T's 9 and 9'. Pipe connections 11 and 11' extend from the respective sides of the T's and pass upwardly through the bottom of the vessel and terminate in open ends in the pressure chambers beneath the slope sheets.

Gas inlets 12 and 12' are connected to the pressure chambers beneath each of the slope sheets. When gas is not being introduced through these inlets, they are closed by sealing caps 13 and 13'. Gas-inlet connections are provided at each side of the vessel so that one of them will be readily accessible to a source of gas supply, regardless of the side of the vessel at which the source of the gas supply may be located.

When gas is introduced into either of the inlets 12 or 12', it will pass through the corresponding connection 11 or 11' at each end of the vessel to the plenum chambers beneath the gas-permeable decks and also through the pipe connection at the other side of the vessel to the pressure chamber beneath the slope sheet at such other side of the vessel. Thus, regardless of which of the inlets 12 or 12' is used for the introduction of the gas, the space beneath each of the slope sheets will be pressurized, and gas will be introduced into each of the plenum chambers to pass upwardly through the gas-permeable deck into the overlying pulverulent material to fluidize it and cause it to flow along the upper surfaces of the gas-permeable decks to the discharge opening 5 in the bottom of the vessel.

A collar 14 extends downwardly from the opening 5 and has an outwardly-extending flange 15 at its lower edge. A separate unit or casing 16, which forms an extension of the lower portion of the vessel, has an outwardly-extending flange 17 at its upper end which is bolted to the flange 15 by bolts 18.

A partition 19 extends across the unit 16 in a direction transversely of the vessel and divides the unit into a material-receiving chamber 21 having an open upper end, and a material-discharge chamber 22. The partition has an opening 23 therein. A bearing plate 24 is secured to the side of the partition facing the chamber 21 and has a substantially semi-circular opening 25 in its lower edge, in registry with the opening 23 in the partition 19, through which material may pass from the chamber 21 to the chamber 22. The effective area of the opening 25 which is exposed for the flow of material is controlled by a rotatable disc valve 26 having an opening 27. The disc valve 26 carries a collar 28 which is fixed to the inner end of a shaft 29 which extends through the chamber 22 to the outside where it carries a handle 31 by which it and the valve disc 26 may be rotated to bring the opening 27 in the valve disc 26 into any desired degree of registry with the opening 25 in the bearing plate 24. The shaft extends through a bearing 32 in the outer wall of the chamber 22 and a gas-tight seal is provided about the shaft by a packing gland 33 secured to the outer end of the bearing 32.

The shaft 29 has a stop washer 34 secured to it within the chamber 22. A compression spring 35 surrounds the shaft and has one end bearing against the stop washer and its other end against a bearing member 36 attached to the partition. The spring exerts an outward force against the stop washer which causes the valve disc 26 to be resiliently held against the bearing plate 24.

The material-discharge chamber 22 has a discharge outlet 37 to which is connected a discharge pipe 38. The discharge pipe 38 is adapted to be connected to a conveying line through which material passing through the discharge pipe 38 may be pneumatically carried to any desired place.

An indicator plate 39, through which the shaft 29 extends, is welded to the upper side of the discharge pipe 38 and is positioned adjacent the handle 31. The plate carries indicia 39' to indicate the extent of opening of the control valve between the chambers 21 and 22 as the handle is swung either to the right or left.

Substantially the entire bottom of the material-receiving chamber 21 is open, as indicated at 40. An aerated unit is connected to the bottom of this chamber beneath the opening 40. It consists of a gas-permeable medium 41 and an underlying plenum chamber 42. Gas may be introduced from plenum chamber 7 through a pipe 43 into plenum chamber 42 to pass upwardly through the gas-permeable medium 41 to maintain material falling into the chamber 21 from the ends of the gas-permeable decks 4 and 4' in a fluidized state until it has passed through the control valve in the partition 19 into the chamber 22. Maintaining the material in the chamber 21 in a fluidized state materially facilitates an even and uniform flow of the material through the control valve for any setting of the valve. It also facilitates its subsequent entrainment for discharge through the discharge opening 37 and discharge pipe 38, as will hereinafter be described.

The upper end of the material-discharge chamber 22 is closed by a top wall 44 which receives the lower end of a gas conduit 45 extending from the upper portion of the vessel. A bracket 46 anchors the upper end of the conduit 45 to the top wall of the vessel. The gas conduit forms a passageway for a flowing stream of pressure gas from the upper portion of the vessel to the material-discharge chamber 22. The stream of gas passing from the lower end of the gas conduit passes into and through the material-discharge chamber 22. As the flowing stream of gas passes the opening 23 in the partition 19, it entrains the fluidized material flowing through the control valve from the chamber 21 and carries it in suspension through the material-discharge outlet 37 and discharge pipe 38 to a connected conveying line. The partition 19, the top wall 44 and the gas conduit 45 form baffling means which hold back the bulk of the material in the vessel from free flow through the discharge outlet 37.

The provision of a separate unit including the chambers 21 and 22 and the control valve for detachable connection to the outer portion of the vessel is particularly advantageous, since by detaching the unit access is readily had to both chambers and to the control valve for repairs, or for ready conversion of the vessel for any other service such as liquid haulage, when the gas-permeable deck is removed, or for gravity unloading.

In large vessels, and particularly when relatively heavy materials, such as hydraulic cement or oil well mud constituents are to be stored and discharged from the vessel, the head of the material in the vessel, or the pseudo-hydrostatic pressure exerted by the weight of the material may be excessive in terms of simplicity and ease of operation of the pump which supplies the fluidizing gas during unloading. Under such conditions, the fluidizing material tends to be extruded or squirted through even the smallest opening in the control valve between the chambers 21 and 22. This makes the degree of opening of the valve extremely critical, especially during the early stages of the unloading operation when the pressure exerted by the head of the overlying material is the greatest. Any excess in the opening of the control valve results in immediate flooding of the material-discharge chamber 22 and the conveying line connected to the discharge pipe 38.

To avoid objectionable extruding or squirting of the fluidized material through the control valve in the partition 19, a pressure-breaker or deflector baffle 47 having a pair of downwardly-sloping walls 48 and 49, arranged as an inverted V, is positioned over the discharge opening 5 leading from the lower portion of the vessel to the material-receiving chamber 21 of the unit 16. The sloping walls 48 and 49 extend to the slope sheets 11 and 11' at each side of the vessel. They may be secured to the slope sheets by welding or in any other manner to hold them in proper position relative to the discharge opening 5.

The deflecting baffle 47 has an opening 51 through which the gas conduit 45 passes. The opening 51 is sufficiently larger than the gas conduit to provide a space between the gas conduit and the adjacent edges of the opening for the passage of pulverulent material.

The sloping walls 48 and 49 are positioned with their lower edges 52 and 53, respectively, overlying and spaced from the upper surfaces of the gas-permeable decks 4 and 4' to provide passageways 54 and 55, respectively, through which pulverulent material fluidized on the gas-permeable decks may flow to the discharge opening 5.

The pressure-breaker or deflecting baffle 47 acts as a shield over the discharge opening 5 and the material-receiving chamber 21 of the unit 16 and holds back most of the overlying material and prevents a wild flow of material from the main bulk thereof in the vessel. The resistance to flow imposed by the restricted passages 51, 54 and 55 dissipates the greater part of the excess pressure exerted by the head of material, while at the same time permits a smooth, high rate of flow through the passageways to the material-receiving chamber 21, and from it through the control valve to the material-discharge chamber 22. Therefore, the pressure exerted by the head of overlying material is relatively stable throughout the unloading operation, and any change therein, such as may be caused by a reduction of the material load in the vessel, is gradual rather than sudden.

In discharging material from the vessel 1, the control valve between the chambers 21 and 22 is closed and one of the gas inlets 12 or 12', say the inlet 12, is connected to a source of gas under pressure, which supplies gas under pressure to plenum chambers 7 and 42. The gas from the inlet 12 will build up a pressure in the space beneath the slope sheet 6 and will then pass through the pipe connections 11 at that side of the vessel into the T's 9 and 9' from which it will pass through the connections 11' to the space beneath the slope sheet 6' at the other side of the vessel. Simultaneously, the gas will pass from the T's 9 and 9' through the gas inlets 8 and 8' into the respective plenum chambers 7 and 7' at each end of the vessel. From the plenum chambers the gas passes upwardly through the pulverulent material overlying the gas-permeable decks 4 and 4' and fluidizes it, causing it to flow downwardly along the upper surfaces of the gas-permeable decks to be discharged through the opening 5 in the bottom of the vessel and into the material-receiving chamber 21 of the unit 16. The fluidized material falling into the chamber 21 is maintained in its fluidized state by the gas passing upwardly through the gas-permeable medium 41 at the bottom of that chamber.

The fluidized gas escaping from the top of the fluidized material collects as pressure gas in the upper portion of the vessel 1 and passes, as a flowing stream, downwardly through the gas conduit 45 into the material-discharging chamber 22 and from it out through the discharge outlet 37 and discharge pipe 38 to the pneumatic conveying line.

After the flow of gas from the upper portion of the vessel downwardly through the gas conduit 45 and chamber 22 and out through the discharge outlet has been established, the handle 31 is moved to the right to rotate the valve disc 26 to cause the opening 25 in the bearing plate 24 to be exposed to the extent necessary to give the desired flow of the fluidized material from the chamber 21 and chamber 22. As the fluidized material flows into the chamber 22, it is entrained by the stream of gas flowing therethrough and is carried, in suspension, through the material-discharge outlet 37 and discharge pipe 38 to the pneumatic conveying line by which it is delivered to the desired place.

During the entire discharge of the material from the vessel, the pressure breaker or deflecting baffle 47 will dissipate the greater part of the pressure exerted by the head of the overlying material and assure a smooth discharge of the material through the control valve in the manner described above.

It is to be understood that the disclosure and description of the preferred embodiment of the invention is merely by way of exemplification and various changes may be made in the details of construction of the described material-discharge means without sacrificing any of the advantages thereof or departing from the scope of the appended claims.

I claim:

1. Apparatus for discharging pulverulent material comprising a vessel, a gas-permeable deck adjacent the bottom of the vessel having a discharge end, means for passing gas under pressure upwardly through the gas-permeable deck to fluidize overlying pulverulent material, an extension of said vessel positioned to receive material from the discharge end of the gas-permeable deck and having a discharge outlet, baffling means for holding back the bulk of material in the vessel against unrestricted flow towards said outlet and including a partition dividing the vessel extension into a material-receiving chamber in open communication with the main space in the vessel and a material-discharging chamber having the discharge outlet, said partition having a material passage for delivering material from the material-receiving chamber to the material-discharging chamber, and valve means for controlling the flow of material through said passage, said baffling means also including a gas conduit within the vessel and connecting the space in the upper portion of said vessel with the material-discharging chamber to provide free communication therebetween, said vessel being substantially closed for the escape of gas separating from the fluidized material into the upper portion of the vessel except as a stream through said gas conduit, said material-discharging chamber and said discharge outlet, whereby material entering the material-discharging chamber is entrained therein and carried through the discharge outlet by the gas stream.

2. Apparatus as set forth in claim 1 having means for fluidizing material flowing into said material-receiving chamber.

3. Apparatus as set forth in claim 1 in which said material-receiving and said material-discharging chambers are part of a separate unit detachably connected to the outside of the vessel.

4. Apparatus as set forth in claim 1 in which the open communication between the vessel and the vessel extension is an opening for discharging material from the vessel into the vessel extension, and which includes barrier means within the vessel and over the discharge opening in the vessel to support a portion of the head of material above said discharge opening and thereby lessen the force exerted on material passing through said discharge opening.

5. Apparatus as set forth in claim 4 in which said barrier means is a deflecting baffle having a portion inclined downwardly towards said gas-permeable deck, the lower edge of said baffle terminating above said gas-permeable deck and spaced therefrom to provide a passageway for material flowing along the upper surface of said gas-permeable deck.

6. Apparatus as set forth in claim 1 in which the vessel is horizontally elongated and has a discharge opening at the longitudinal midsection thereof communicating with the vessel extension, a gas-permeable deck is inclined downwardly from each end of the vessel, and each gas-permeable deck has a discharge end terminating adjacent said discharge opening.

7. Apparatus as set forth in claim 6 including barrier means within the vessel and over said discharge opening in the vessel to support a portion of the head of material above said discharge opening and thereby lessen the force exerted on material passing through said opening.

8. Apparatus as set forth in claim 7 in which said barrier means includes deflecting baffles downwardly inclined, respectively, towards the discharge end portions of said gas-permeable decks, the lower ends of said baffles terminating above said gas-permeable decks and spaced therefrom to provide passageways for material flowing along the upper surfaces of said gas-permeable decks.

9. Apparatus as set forth in claim 8 in which said gas conduit passes through said barrier means and there is a space between said gas conduit and said barrier means for the flow of pulverulent material.

References Cited in the file of this patent
UNITED STATES PATENTS

| | | |
|---|---|---|
| 2,530,689 | Egger | Nov. 21, 1950 |
| 2,565,835 | Adams | Aug. 28, 1951 |
| 2,580,215 | Bozich | Dec. 25, 1951 |
| 2,657,100 | Weller | Oct. 27, 1953 |
| 2,681,748 | Weller | June 22, 1954 |
| 2,795,463 | Weller | June 11, 1957 |

UNITED STATES PATENT OFFICE
Certificate of Correction

Patent No. 2,915,339                                                                  December 1, 1959

Emile W. Lusted

It is hereby certified that error appears in the above numbered patent requiring correction and that the said Letters Patent should read as corrected below.

In the grant, lines 2 and 3, for "assignor, by mesne assignments, to Fuller Company, of Catasauqua, Pennsylvania, a corporation of Delaware," read —assignor, by direct and mesne assignments, of one-half to Delta Tank Mfg. Co., Inc., of Baton Rouge, Louisiana, a corporation of Louisiana, and one-half to Fuller Company, of Catasauqua, Pennsylvania, a corporation of Delaware,—; line 12, for "Fuller Company, its successors" read —Delta Tank Mfg. Co., Inc., and Fuller Company, their successors—; in the heading to the printed specification, lines 3 to 5, for "assignor, by mesne assignments, to Fuller Company, Catasauqua, Pa., a corporation of Delaware" read —assignor, by direct and mesne assignments, of one-half to Delta Tank Mfg. Co., Inc., Baton Rouge, La., a corporation of Louisiana, and one-half to Fuller Company, Catasauqua, Pa., a corporation of Delaware—; column 8, after line 23, insert the following claim:

10. A discharge unit for attachment to a substantially closed vessel having a discharge opening in its lower region and for the conversion of such vessel for the discharge of pulverulent material comprising a casing, a vertically-extending partition within said casing dividing the casing into material-receiving and material-discharge chambers horizontally disposed relative to one another at each side thereof, said material-receiving chamber having an inlet for communication with the discharge opening of the vessel to receive material therefrom, said partition having a passageway therein connecting the material-receiving and the material-discharging chambers, said partition forming a substantially complete barrier between the material-receiving and the material-discharging chambers within the casing except for said passageway therein, valve means for controlling the flow of material through said passageway, said material-discharging chamber having a discharge outlet, a gas-permeable deck adjacent the bottom of the material-receiving chamber, means for passing a gas upwardly through the gas-permeable deck to fluidize overlying material, and means for admitting to said material-discharging chamber gas separating from the fluidized material for discharge through the discharge outlet of the material-discharging chamber, whereby the gas admitted to the material-discharging chamber will entrain material entering through the passageway to carry it in suspension through the discharge outlet.

in the heading to the printed specification, line 7, for "9 Claims." read —10 Claims.—; column 3, line 26, for "is", second occurrence, read —its—.

Signed and sealed this 24th day of May 1960.

[SEAL]

Attest:
KARL H. AXLINE,
*Attesting Officer.*
                                                          ROBERT C. WATSON,
*Commissioner of Patents.*